US008465174B2

(12) United States Patent
Ing et al.

(10) Patent No.: US 8,465,174 B2
(45) Date of Patent: Jun. 18, 2013

(54) DIRECT-LIT LIGHT BOX WITH EVEN-WIDTH FRAME DESIGN

(75) Inventors: Wen-Chiun Ing, Xindian (TW); Wei-Hsin Hou, Taipei (TW)

(73) Assignee: Luxingtek, Ltd., Zhubei (TW)

( * ) Notice: Subject to any disclaimer, the term of this patent is extended or adjusted under 35 U.S.C. 154(b) by 260 days.

(21) Appl. No.: 12/985,471

(22) Filed: Jan. 6, 2011

(65) Prior Publication Data

US 2011/0169429 A1    Jul. 14, 2011

Related U.S. Application Data

(60) Provisional application No. 61/282,251, filed on Jan. 8, 2010.

(51) Int. Cl.
*F21S 4/00* (2006.01)
*F21S 6/00* (2006.01)
*F21V 21/00* (2006.01)

(52) U.S. Cl.
USPC ............ 362/249.01; 362/249.02; 362/249.03; 362/249.04; 362/382; 362/257

(58) Field of Classification Search
None
See application file for complete search history.

(56) References Cited

U.S. PATENT DOCUMENTS

| 7,808,580 | B2 * | 10/2010 | Song et al. | 349/69 |
| 2008/0259240 | A1 * | 10/2008 | Song et al. | 349/62 |
| 2011/0043768 | A1 * | 2/2011 | Nakayama et al. | 353/38 |

* cited by examiner

*Primary Examiner* — Natalie Walford
(74) *Attorney, Agent, or Firm* — Bacon & Thomas, PLLC

(57) ABSTRACT

A light box defined with a peripheral portion and a display portion is provided. The peripheral portion has four margins, and the opposing margins being defined with equal widths. The display portion is surrounded by the peripheral portion and is rectangular. The light box comprises at least two sets of electrode pads and an outer frame. The at least two sets of the electrode pads are disposed on at least two of the margins, respectively, and each set of the electrode pads comprises a connector electrode pad, disposed at the corresponding margin. With the arrangement of the at least two sets of the electrode pads, the light box can be panelized with one or more lighting panels.

17 Claims, 19 Drawing Sheets

DIRECT-LIT LIGHT BOX WITH EVEN-WIDTH FRAME DESIGN

This application claims the benefit of priority based on U.S. Provisional Application No. 61/282,251 filed on Jan. 8, 2010, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a light box, more particularly, relates to a direct-lit light box comprising ultra-slim lighting panel and even-width frame design.

2. Descriptions of the Related Art

In recent years, the light boxes have been widely used in commercial places, such as factories, offices, hospitals, schools, and stores etc., for propaganda and advertising. In order to match up with different environments and purposes, conventional light boxes with the lighting panel devices are usually made in standard shapes and dimensions, which have been determined before producing.

The lighting panel devices of the conventional light boxes may be categorized into direct-lit backlight modules or edge-lit backlight modules according to light sources arrangements. Between these two kinds of backlight modules, the direct-lit backlight modules provide more uniform light compared with the edge-lit backlight modules especially for large-scale light boxes. Therefore, the direct-lit light boxes with direct-lit backlight modules are used widely.

This conventional direct-lit light box with large scale performs better light uniformity, however, occupies huge overall volume and consequently makes it difficult to transport and set up. Furthermore, light sources of the conventional direct-lit light box are light tubes or light bar, each of which can merely be turned on or off, such that the demonstration effect produced by the conventional light boxes is monotonous and can hardly meet the need for providing various visual effects.

In view of this, a revolutionary direct-lit light box with the lighting panel device, which adapts LED array as the light sources, becomes a new development trend. People skilled in this field all put their effort for the related advanced applications such as ultra-slim light boxes which provide better light uniformity and various visual effects. Besides, efficiently converting dot light sources, provided by LEDs, to a uniform surface light source in the direct-lit light boxes without utilizing any complicated and costly optical devices is another important research task in this field.

In fact, most of the commercial light box do not have local dimming or regional on/off feature, and therefore, do not incorporate control electronics therein. Generally, in order to provide flexible use, local dimming and regional on/off functions and control electronics embedded inside the light box product are necessarily required. However, it is difficult to design an even-width frame for such applications. Even the conventional light box with even-width frame design, the power adapter outlet and program switch button are hard to be located at adequate locations and can not be adapted for both portrait and landscape orientations at the same time.

As a result, the aforesaid technologies in the prior art have several disadvantages to be overcome. Accordingly, a need of providing a slim direct-lit light box which can be panelized by even-width frame designed lighting panel and can be applied for both portrait and landscape orientations still remains in the art.

SUMMARY OF THE INVENTION

To solve the aforesaid problems, an objective of the present invention is to provide a light box with even-width frame design. For such light box, lighting panel therein can be panelized, and therefore, the light box of the present invention can be various sizes and provides both portrait and landscape orientation usages.

To achieve the aforesaid objective, the present invention provides a light box, which is defined with a peripheral portion and a display portion. The light box further comprises at least two sets of electrode pads and an outer frame. The peripheral portion has four margins, and the opposing margins being defined with equal widths. The display portion is surrounded by the peripheral portion and is rectangular. The at least two sets of the electrode pads are disposed on at least two of the margins, respectively, and each set of the electrode pads comprises a connector electrode pad, disposed at the corresponding margin.

More specifically, when the light box is panelized by only one lighting panel, the outer frame has two of the margins of the peripheral portion. In this configuration, there are two sets of the electrode pads, and theses two sets of the electrode pads are disposed on the two margins, not comprised in the outer frame, respectively.

When the light box is panelized by two lighting panels, the outer frame would only have one of the margins of the peripheral portion. In this configuration, there are three sets of the electrode pads, and theses three sets of the electrode pads are disposed on the three margins, not comprised in the outer frame, respectively. More specifically, there are two sets of the electrode pads disposed on the same margin, and the connector electrode pads of these two sets of the electrode pads are connected.

When the light box is panelized by four lighting panels, there are eight sets of the electrode pads, and theses eight sets of the electrode pads are disposed on the four margins. The outer frame does not comprise any one of the margins of the peripheral portion. More specifically, each margin is disposed with two sets of the electrode pads, and the connector electrode pads of the two sets of the electrode pads, disposing on the same margin, are connected.

In the light box of the present invention, there is a control circuit disposed on the peripheral portion, and the display portion comprises a plurality of LEDs. In summary, the light box is configured with at least two sets of the electrode pads, the outer frame, the control circuit, the plurality of LED, and a circuit board. The light box may further comprise a light spreading structure, spacer bars, a diffuser plate, an image plate, a cover, magnets, and black mask layers for better illumination.

With the aforesaid arrangement of the present invention, the light box can combine advantages of different orientation uses, local dimming function, regional on/off feature, various visual effects and large-scale. Furthermore, the use of the LED light sources not only significantly decreases volume and power consumption of the light box, but also improves resolution, service life and stability of the light box. Thereby, attractively decorative effects can be presented to the user's eyes directly, and the problems of the prior art gets effectively solved.

The direct-lit light box with a large scale is formed by assembling a plurality of lighting panels and thereby the size and shape of the light box may be flexible for adjustment as required. In addition, since each LED light source of the direct-lit light box can be individually controlled, the LED light sources can be manipulated to form various patterns such us words, signs, message or pictures and logos. Therefore, viewers not only can see an illuminated image of a photographic film on the light box, but also can see the various patterns formed by the LED light sources through the photographic film. Thus, a special visual effect for the light box can be obtained.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, a light box of the present invention will be explained with reference to embodiments thereof. However, these embodiments are not intended to limit the present invention to any specific environment, applications or particular implementations described in these embodiments. Therefore, descriptions of these embodiments are only for the purpose of illustration rather than for limiting the present invention.

Figure 1:
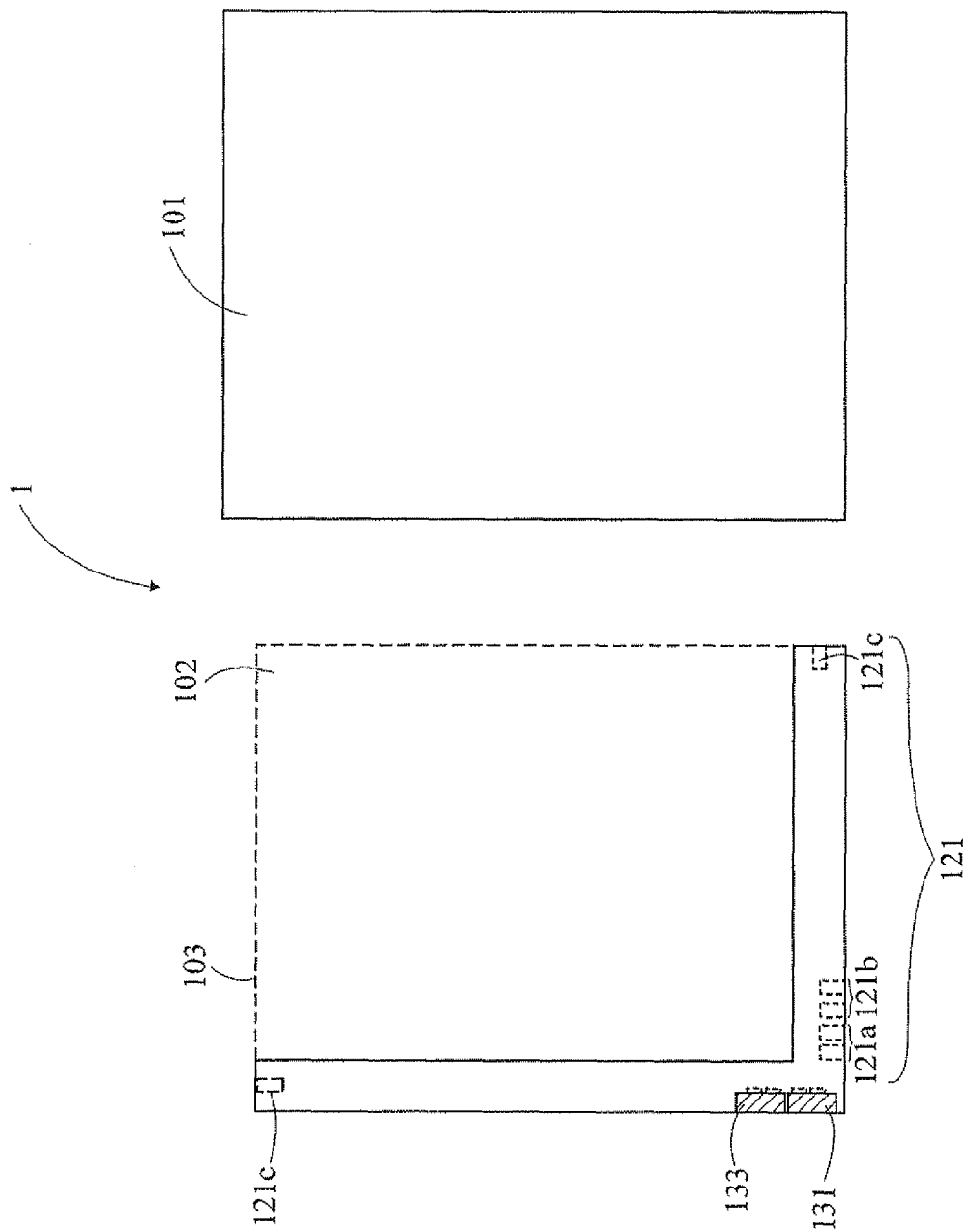
FIG. 1 is a partially schematic diagram illustrating a circuit layout structure in a portrait orientation of a lighting panel device according to a first preferred embodiment of the present invention.
Figure 2A:
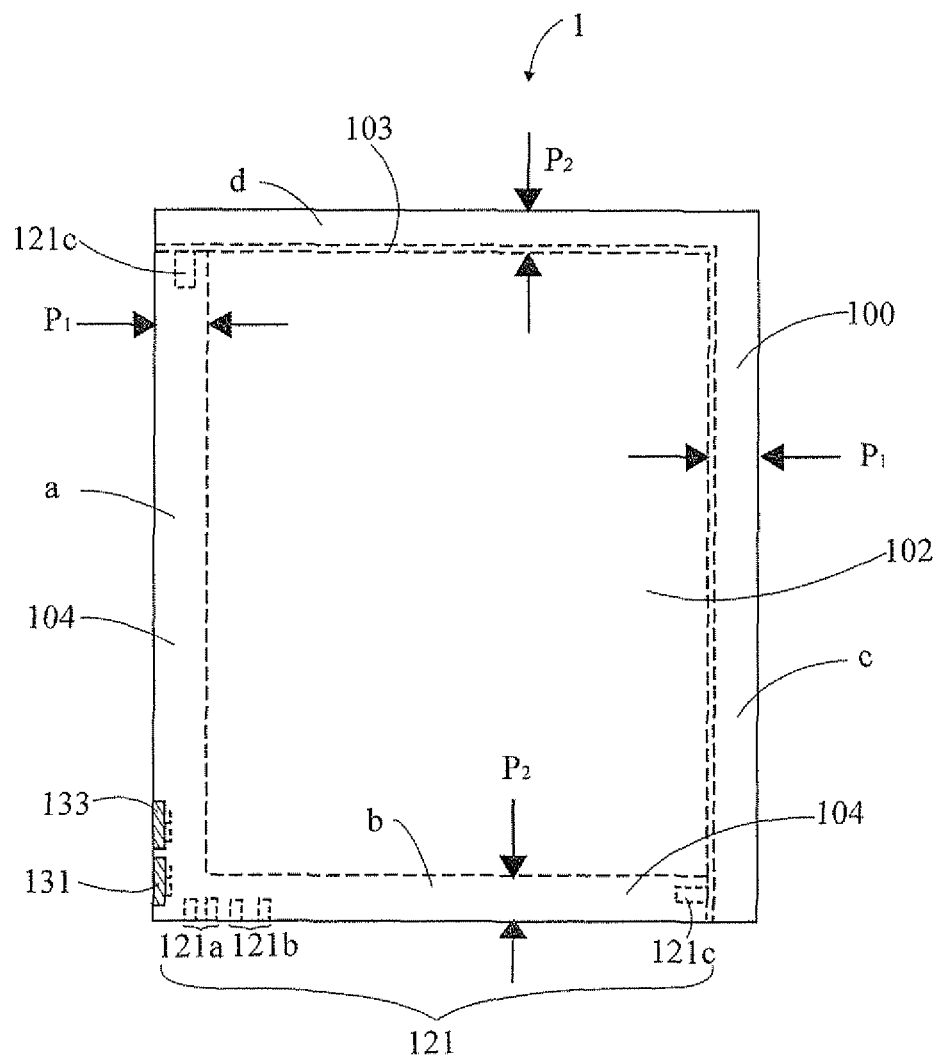
FIG. 2A is partially schematic diagram illustrating a first structural aspect of the A3 sized circuit layout structure in a portrait orientation of a lighting panel device according to the first preferred embodiment of the present invention.
Figure 2B:
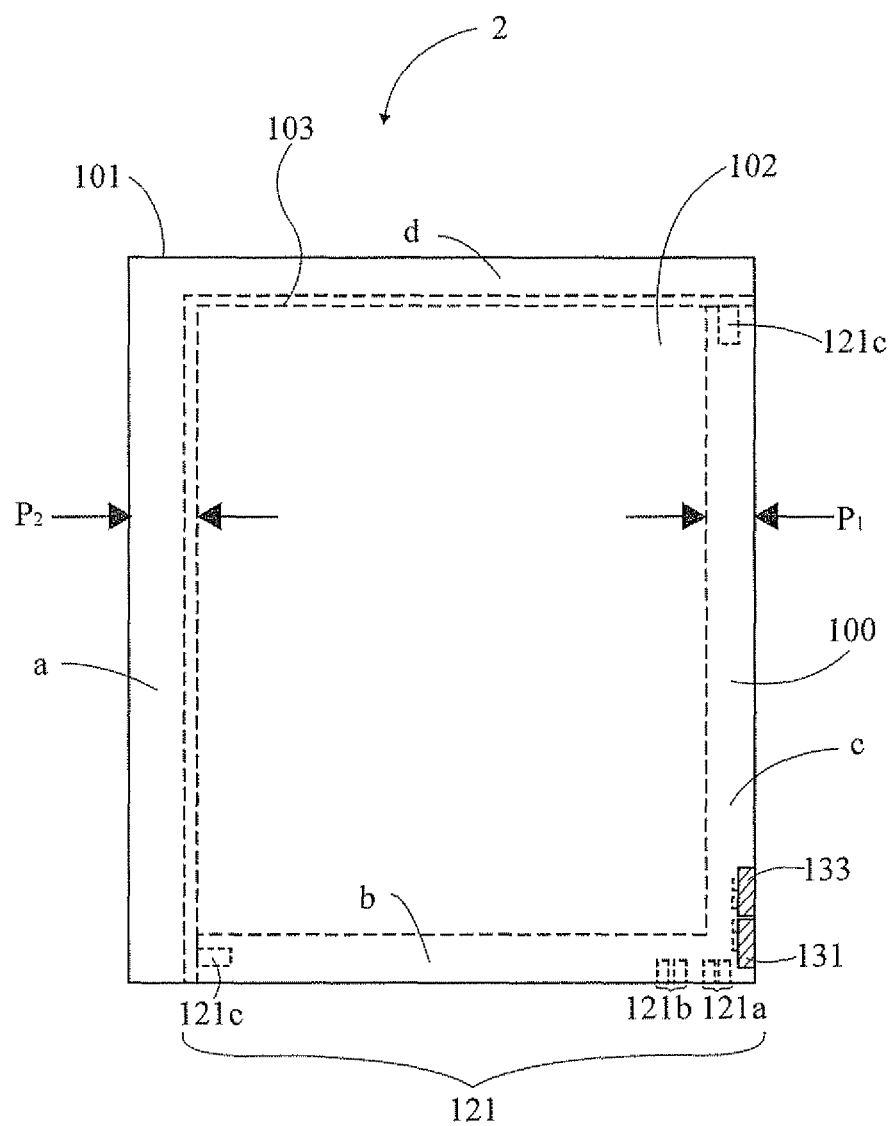
FIG. 2B is partially schematic diagram illustrating a second structural aspect of the A3 sized circuit layout structure in a portrait orientation of a lighting panel device according to the second preferred embodiments of the present invention.
Figure 2C:
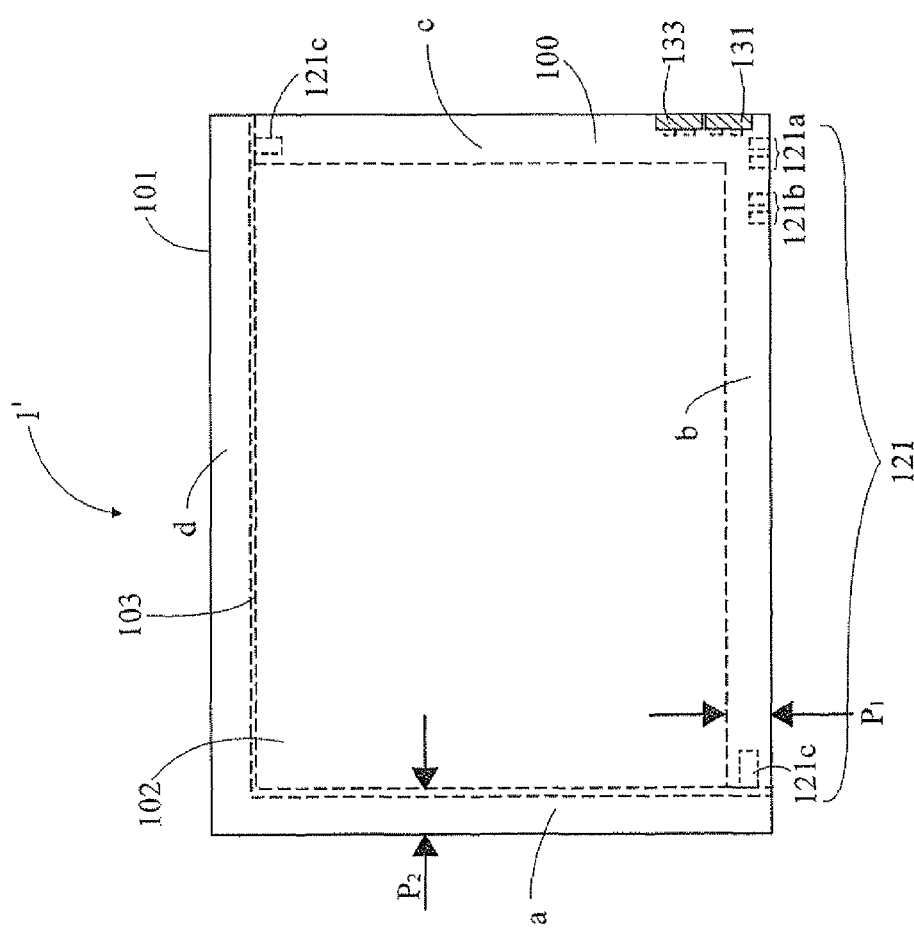
FIG. 2C is a partially schematic diagram illustrating a third structural aspect of an A3 sized circuit layout structure in a landscape orientation of a lighting panel device according to the third preferred embodiment of the present invention.

FIG. 1 is an exploded diagram illustrating a part of a light box in a portrait orientation with an A3 sized display portion according to a first preferred embodiment of the present invention. FIG. 2A is an assembly diagram illustrating a part of the light box of FIG. 1 in the portrait orientation according to the first preferred embodiment of the present invention. FIG. 2B is an assembly diagram illustrating a part of another structural aspect of the light box of FIG. 1 in the portrait orientation according to the first preferred embodiment of the present invention. FIG. 2C is an assembly diagram illustrating a part of the light box of FIG. 1 in the landscape orientation according to the first preferred embodiment of the present invention.

As illustrated in FIGS. 1, 2A to 2C, the light box 1 can be defined with a peripheral portion 100 and a display portion 102. Moreover, the light box 1 has an outer frame 101, a circuit board 103, two sets of electrode pads 121, a control circuit (not shown), a light spreading structure (not shown), spacer bars (not shown), a diffuser plate (not shown), an image plate (not shown), a cover, magnets (not shown), and black mask layers (not shown).

The peripheral portion 100 has four margins a, b, c, d, and the opposing margins are defined with equal widths. As shown in FIGS. 2A-2C, the margins a, c have the same width $P_1$, and margins b, d have the same width $P_2$. More specifically, the four margins a, b, c, d of this embodiment all have the same width, and an even-width light box 1 would be obtained thereby. It should be noted that there may be width errors between opposing margins in practice. Moreover, people skilled in this art may derive other aspects in which only the opposing margins have the same width.

In the first preferred embodiment, the light box 1 is panelized by only one lighting panel, and the outer frame 101 has two of the margins c, d of the peripheral portion 100. More specifically, the two margins c, d of the outer frame 101 in this embodiment are located at the upper right corner, and the other margins a, b are located at the lower left corner as shown in FIG. 2A. The two margins a, b form an L shape, and the two margins c, d also form an L shape. The outer frame 101 and the circuit board 103 define the margins c, d, and this means that the rest areas of the outer frames 101 without being covered by the circuit board 103 are the margins c, d. In this embodiment, the outer frame 101 is made of materials such as metals, alloys, ceramics, plastics or composite materials.

The display portion 102 is surrounded by the peripheral portion 100 and is rectangular with an A3 size. In other aspect of the present invention, the display portion 102 can be other sizes, such as A1, A2, A4, B1, B2, B3, B4, C1, C2, or C3 size. Furthermore, the display portion 102 is not limited to a rectangle, and can be other shapes, for example, a square, a rhombus or a trapezoid.

The two sets of the electrode pads 121 are respectively disposed on the two margins a, b, which are not comprised in the outer frame 101, and each of the two sets of the electrode pads 121 comprises a plurality of elements, such as power adapter pads 121a (adapted for DC adapter 131), button pads 121b (adapted for program switch buttons 133) and connector electrode pads 121c. The power adapter pads 121a, the button pads 121b and the connector electrode pads 121c are disposed on the two perpendicular sides with a diagonal line of symmetry, and the connector electrode pads 121c are specifically disposed at the corresponding margin (one of the power adapter pads 121a and one of the button pads 121b are partially shielded by the DC adapter 131 and the program switch button 133). As shown in FIGS. 2A-2C, the two connector electrode pads 121c of this embodiment are disposed at the ends of the margins a, b. It should be noted that either the power adapter pads 121a or the button pads 121b can be omitted in one set of the electrode pads 121 in other aspects.

As shown in FIGS. 1, 2A-2C, the margins a, b of the peripheral portion 100 and the display portion 102 are located on the circuit board 103. The circuit board 103 can be a printed circuit board (PCB), metal core printed circuit board (MCPCB) or a flexible printed circuit board (FPC). There is an electrode layer formed on the upper surface of the circuit board 103 to form electrical connection for the control circuit disposed on the circuit board 103. Alternatively, the circuit board 103 can also be made of plastic, ceramic or polymer composites.

The display portion 102 is disposed with a plurality of LEDs (not shown). In this embodiment, the LEDs are SMD type LEDs which can be electrically connected to the electrode layer by a conventional SMT process. The LEDs, arranged in a rectangular array, are disposed on the display area 102. It should be noted that the arrangement of the LEDs is not limited to an array but any arrangement for meeting practical requirements.

Furthermore, the control circuit is disposed on the margins a, b, which are defined adjacent to two perpendicular sides of the display area 102. Intentionally, the control circuit is disposed on the peripheral portion 100, and is especially disposed on the margins a, b in the present embodiment. The control circuit comprises an LED driver (not shown), a micro controller unit (MCU) (not shown), a plurality of switches (not shown), a DC/DC converter (not shown), the DC adapter 131 and the program switch buttons 133, whereas the details with respect to the control circuit and the LEDs would be illustrated in detail in the following paragraphs and are omitted herein.

The light box 1 is connected to an AC/DC power adapter, which converts AC power to DC power and supply such DC power to the light box 1 through the DC adapter 131.

After assembling the circuit board 103, which has been disposed with the two sets of the electrode pads 121 and the DC adapter 131 and the program switch buttons 133, and the outer frame 101, as illustrated in FIG. 2A, the basic framework structure of the light box 1 of the first preferred embodiment is finished. Especially, the display portion 102 is in A3 size, and the light box 1 is adapted for a portrait orientation display. In this embodiment, the circuit board 103 is disposed at the lower left corner of the corresponding outer frames 101, and the margins a, b are defined at the lower left corner of the circuit board 103.

According to the abovementioned disclosures, either set of the pads 121 disposed on the corresponding perpendicular side may be chosen for disposing a DC adapter 131 on the power adapter pads 121a and disposing a program switch button 133 on the button pads 121b during the assembly of the light box 1. The DC adapters 131 and the program switches buttons 133 are located at adequate locations approaching the corners of the light box 1 as required, wherein each of the DC adapters 131 is substantially electrically connected to a DC/DC converter, and the program switches buttons 133 are responsible for the trigger the modes of programs for lighting.

As shown in FIG. 2A, the circuit board 103 is disposed at the lower left corner of the outer frame 101 of the light box 1. In another aspect shown in FIG. 2B, the circuit board 103 is disposed at the lower right corner of the outer frame 101 of the light box 2, and this is another structural aspect of the first embodiment. In this aspect, the margins b, c are defined at the lower right corner of the circuit board 103. The outer frame 101 and the circuit board 103 define the margins a, d, and this means that the rest areas of the outer frames 101 without being covered by the circuit board 103 are the margins a, d. Being similar to the light box 1, the aspect of the light box 2 shown in FIG. 2B also has four margins a, b, c, d. The opposing margins are defined with equal widths as shown in FIG. 2B. The margins a, c have the same width $P_1$, and margins b, d have the same width $P_2$. More specifically, the four margins a, b, c, d of this aspect all have the same width, and an even-width light box 2 would be obtained thereby.

After rotating the light box 1 90 degrees counter clock wise, the light box 1 for portrait display would become suitable for landscape display with the even frame width. FIG. 2C shows the light box 1' for landscape display with the even frame width. Moreover, the positions of the DC adapters 131 and the program switches buttons 133 of the light box 1' are adjusted for convenient use. Similarly, the light box 2 can be also used for landscape display after being rotated 90 degrees. As a result, the design for arranging the locations of DC adapters 131 and the program switches buttons 133 may be adjusted according to orientation requirements. It is worth to note that, for user's convenience, double sets of DC adapters and program switches buttons can be disposed on both the two sets of the electrode pads 121 respectively. This way, the user can have options to use either set of the DC adapters and program switch buttons according to different orientations of the light box. Incidentally, elements in the FIGS. 2B, 2C for explaining the light box 2, 1', having the same function are denoted by the same reference numerals illustrated in FIGS. 1, 2A and the repetitive explanation will be omitted.

Moreover, from the viewpoint of large-size light box design, the light box 1, 2, 1' can be panelized to have A2 or A1 size display portion 102 by virtue of the even-width frame design and the diagonal symmetry pads. It is therefore the frame has equal width on four sides of the assembled light box 1 of the present invention. With the aforesaid basic framework structure, the light box 1 can be panelized to have a display portion 102 with A3 size, A2 size or A1 size as required obtaining even-width frame design for large-scale direct-lit light box application, and the related details would be illustrated as follows. The elements of the following embodiments and aspects are similar to the first preferred embodiment and will be omitted for concision.

Figure 3A:
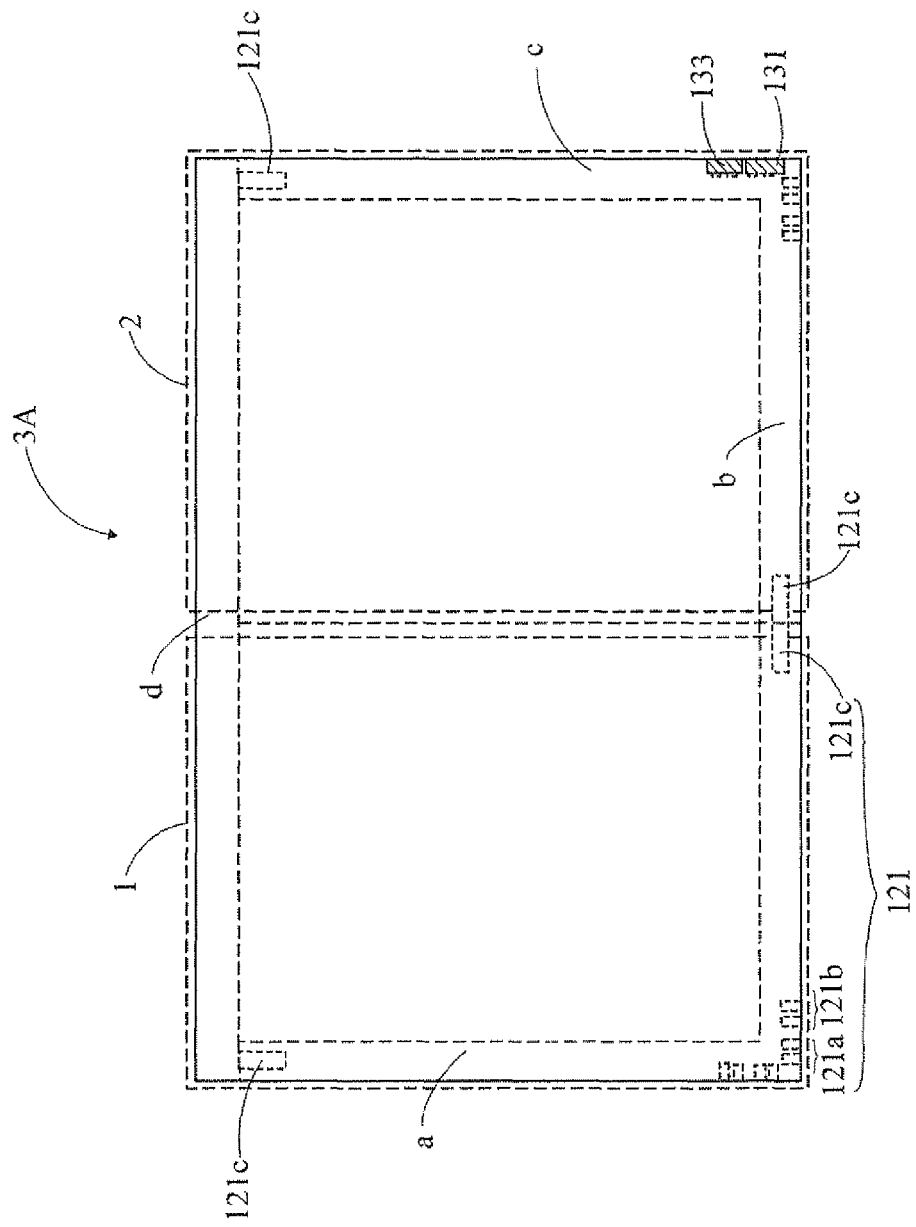
FIG. 3A and FIG. 3B are schematic diagrams illustrating A2 sized circuit layout structures panelized by two A3 sized circuit layout structures of the first and second embodiments of the present invention in a landscape orientation and a portrait orientation, respectively.
Figure 3B:
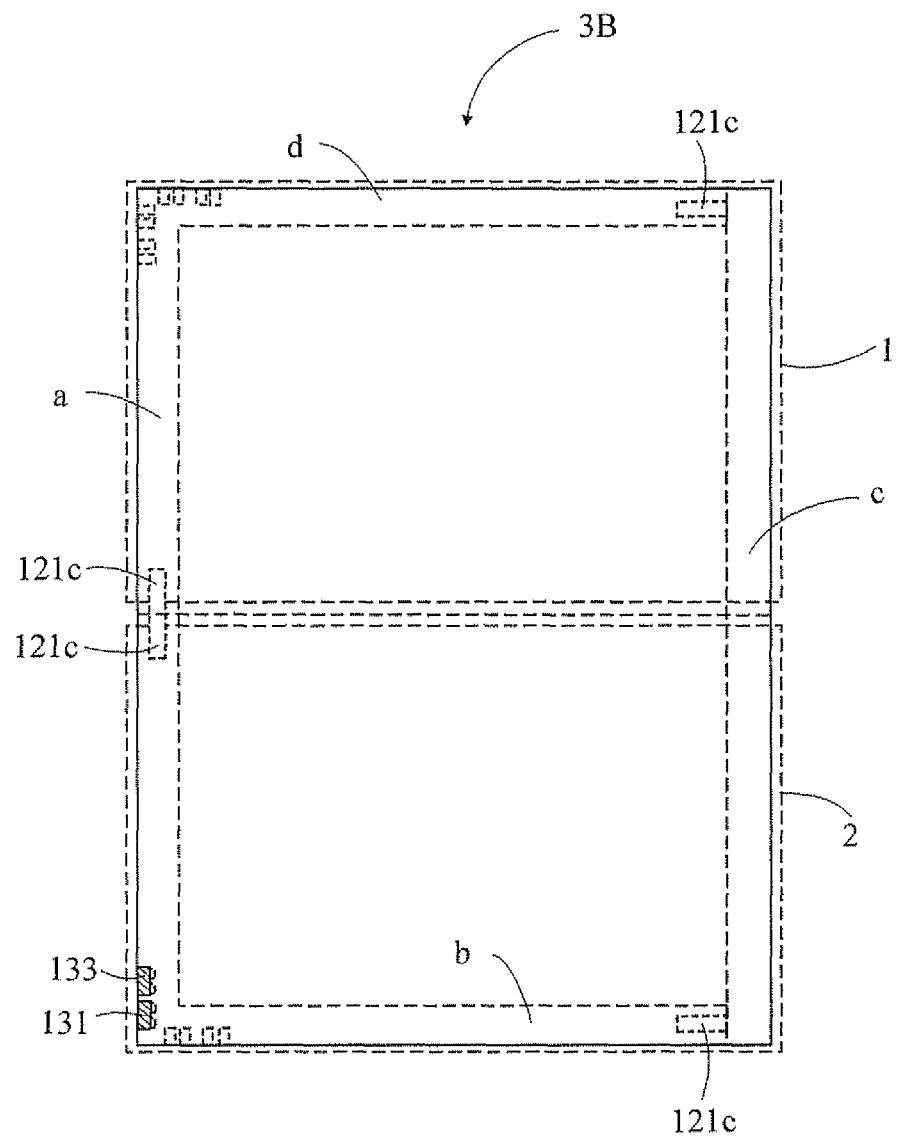

The second preferred embodiment of the present invention is a direct-lit light box which has an A2 sized display portion. FIG. 3A and FIG. 3B are schematic diagrams illustrating a part of light boxes 3A and 3B with A2 sized display portions in a landscape orientation and in a portrait orientation, respectively according to the second preferred embodiment of the present invention.

The light box 3A is also defined with a peripheral portion 100 and a display portion 102. The light box 3A has similar elements as the light box 1, and the difference between the light box 3A and the light box 1 is that the light box 3A has four sets of the electrode pads 121 and adopts a bigger outer frame 101. FIG. 3A only shows the outer frame 101, the circuit board 103, the four sets of the electrode pads 121, the DC adapter 131 and the program switch buttons 133 of the light box 3A for illustration.

The light box 3A with an A2 sized display portion 102 in the landscape orientation is panelized by two lighting panels. In detail, the light box 3A is assembled an outer frame 101 with the circuit boards 103 of the light box 1 and of the light box 2 of the first preferred embodiment as illustrated in FIGS. 2A and 2B. Since each of the circuit boards 103 of the light box 1 and of the light box 2 has an A3 sized display portion 102, the combined circuit board 103 of the light box 3A would has an A2 sized display portion 102.

The peripheral portion 100 of the light box 3A has four margins a, b, c, d, and the opposing margins are defined with equal widths. As shown in FIG. 3A, the margins a, c have the same width $P_1$, and margins b, d have the same width $P_2$. More specifically, the four margins a, b, c, d of this embodiment all have the same width, and even-width light box 3A would be obtained thereby.

The outer frame 101 of the light box 3A has one of the margins d. More specifically, the margin d of the outer frame 101 in this embodiment is located at the top side of the light box 3A, and the other margins a, b, c are located at the right, bottom and right sides of the light box 3A as shown in FIG. 3A. The three margins a, b, c form a U shape. The outer frame 101 and the circuit board 103 define the margin d, and this means that the rest area of the outer frames 101 without being covered by the circuit board 103 is the margin d. In this embodiment, the outer frame 101 is made of materials such as metals, alloys, ceramics, plastics or composite materials.

The four sets of the electrode pads 121 are disposed on the three margins a, b, c, which are not comprised in the outer frame 101. More specifically, two sets of the electrode pads 121 are disposed on the margins a, c, respectively, and the other two sets of the electrode pads 121 are disposed on the same margin b as shown in FIG. 3A. Each of the four sets of the electrode pads 121 comprises a plurality of elements, such as power adapter pads 121a (adapted for DC adapter 131), button pads 121b (adapted for program switch buttons 133) and connector electrode pads 121e. The power adapter pads 121a, the button pads 121b and the connector electrode pads 121c are disposed on the three margins a, b, c with a diagonal line of symmetry. As shown in FIG. 3A, two connector electrode pads 121 are disposed at the ends of the margins a, c, and the other two connector electrode pads 121 are disposed and connected with each other at the middle of the margin b. In other words, the connector electrode pads 121c of the circuit boards 103 of the light box 1 and of the light box 2 are electrically connected.

As shown in FIG. 3A, the margins a, b, c of the peripheral portion 100 and the display portion 102 are located on the circuit board 103. The control circuit is disposed on the margins a, b, c, which are defined adjacent to the right, bottom and right sides of the display area 102. Intentionally, the control circuit is disposed on the peripheral portion 100, and is especially disposed on the margins a, b, c in the present embodiment.

As illustrated in FIG. 3B, the light box 3B with an A2 sized display portion 102 in a portrait orientation is obtained with the same way as the light box 3A. In fact, the light box 3B is the light box 3A, which has been rotated 90 degrees counter clock wise. Moreover, the positions of the DC adapters 131 and the program switches buttons 133 of the light box 3B are adjusted for convenient use. Once again, it is worth to note that, for user's convenience, double sets of DC adapters and program switches buttons can be disposed on both the two sets of the electrode pads 121 respectively. This way, the user can have options to use either set of the DC adapters and program switch buttons according to different orientations of the light box. Elements having the same function are denoted by the same reference numeral illustrated in FIGS. 1, 2A and 2B, and the repetitive explanation will be omitted.

Figure 4A:
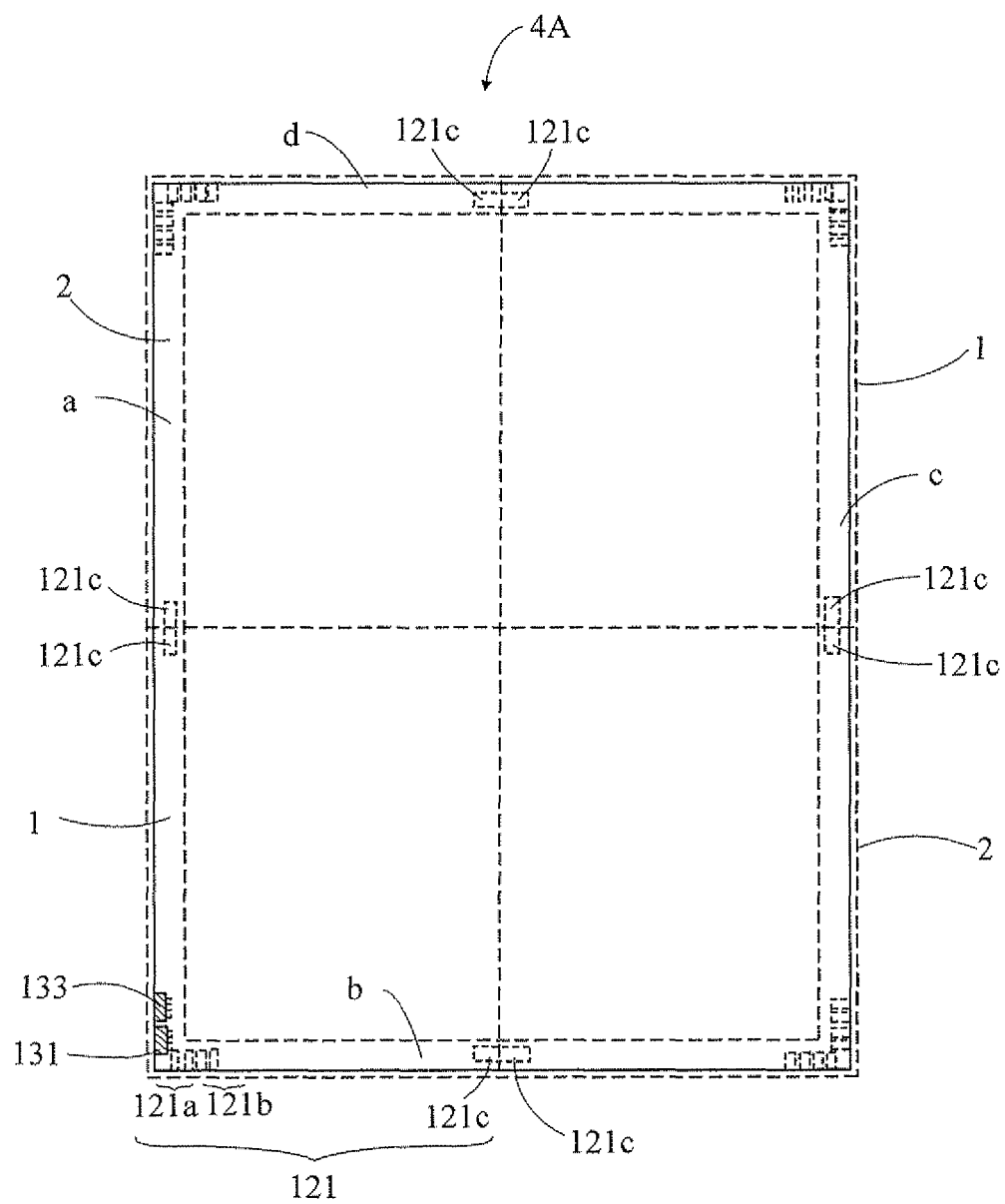
FIG. 4A and FIG. 4B are schematic views illustrating A1 sized circuit layout structures panelized by two different A2 sized PCB structure of the preferred embodiments of the present invention.
Figure 4B:
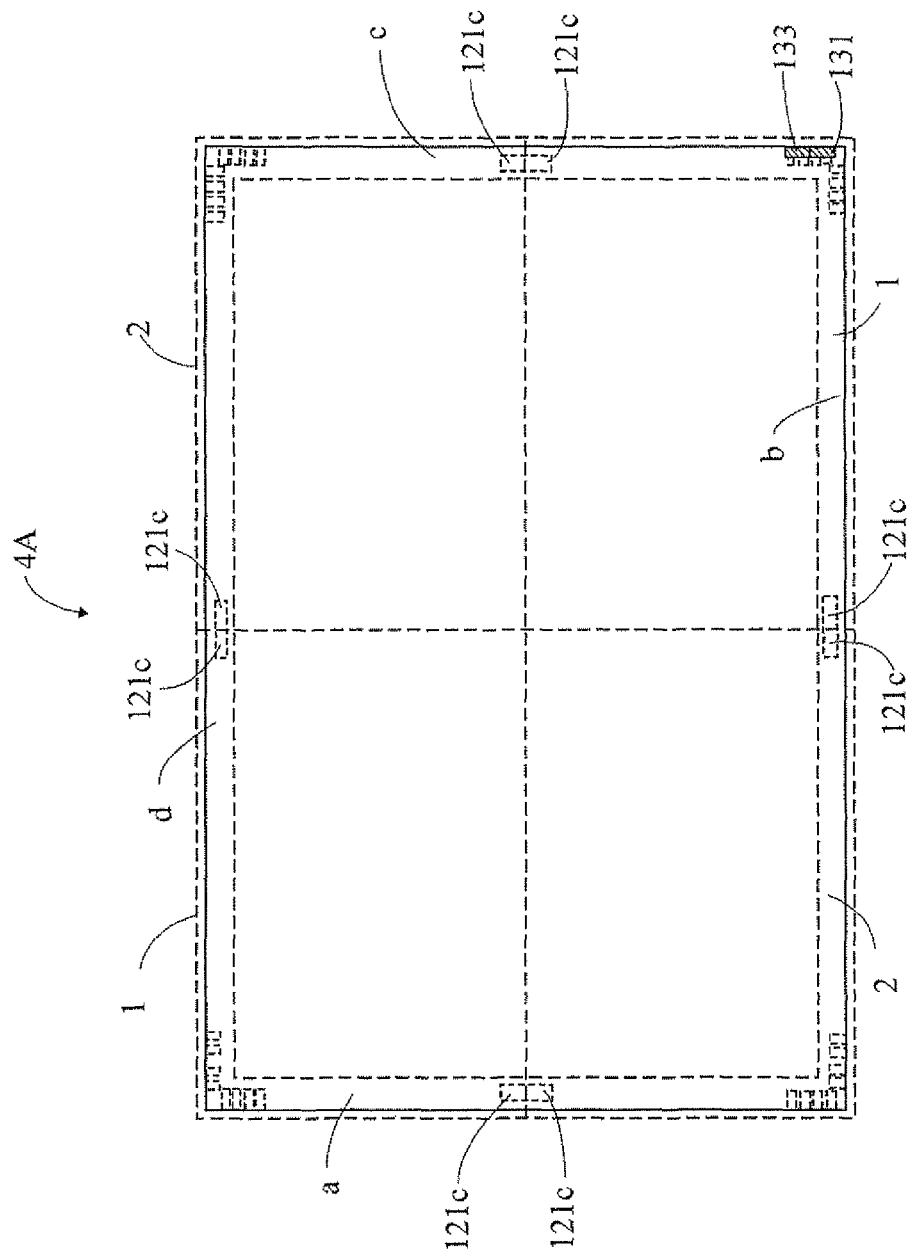

The third preferred embodiment of the present invention is a direct-lit light box which has an A1 sized display portion 102. FIG. 4A and FIG. 4B are schematic diagrams illustrating a part of light boxes 4A and 48 with A1 sized display portions 102 in a portrait orientation and in a landscape orientation, respectively, according to the third preferred embodiment of the present invention.

The light box 4A is also defined with a peripheral portion 100 and a display portion 102. The light box 4A has similar elements as the light box 1, and the difference between the light box 4A and the light box 1 is that the light box 4A has eight sets of the electrode pads 121 and adopts a bigger outer frame 101. FIG. 4A only shows the circuit board 103, the eight sets of the electrode pads 121, the DC adapter 131 and the program switch buttons 133 of the light box 4A for illustration.

The light box 4A with an A1 sized display portion 102 in the portrait orientation is panelized by four lighting panels. In detail, the light box 4A is assembled an outer frame 101 with the two circuit boards 103 of the light box 1 and the two circuit boards 103 of the light box 2 of the first preferred embodiment as illustrated in FIGS. 2A and 2B. Since each of the circuit boards 103 of the light box 1 and of the light box 2 has an A3 sized display portion 102, the combined circuit board 103 of the light box 4A would has an A1 sized display portion 102.

The peripheral portion 100 of the light box 4A has four margins a, b, c, d, and the opposing margins are defined with equal widths. As shown in FIG. 4A, the margins a, c have the same width $P_1$, and margins b, d have the same width $P_2$. More specifically, the four margins a, b, c, d of this embodiment all have the same width, and even-width light box 4A would be obtained thereby.

The outer frame 101 of the light box 4A does not have any margin. More specifically, all of the four margins of the peripheral portion 100 are located on the circuit board 103, and these four margins a, b, c, d are located at the edges of the circuit board 103 as shown in FIG. 4A. The control circuit is disposed on the margins a, b, c, d of the peripheral portion 100 in the present embodiment.

The eight sets of the electrode pads 121 are disposed on the four margins a, b, c, d. More specifically, each margin is disposed with two sets of the electrode pads 121 as shown in FIG. 4A. Each of the eight sets of the electrode pads 121 comprises a plurality of elements, such as power adapter pads 121a (adapted for DC adapter 131), button pads 121b (adapted for program switch buttons 133) and connector electrode pads 121c. The power adapter pads 121a, the button pads 121b and the connector electrode pads 121c are disposed on the four margins a, b, c, d with a diagonal line of symmetry. As shown in FIG. 4A, two connector electrode pads 121 of the two sets of the electrode pads 121, which are disposed at the same margin, are disposed and connected with each other at the middle of the corresponding margin. In other words, the connector electrode pads 121c of the two circuit boards 103 of the light box 1 and of the two circuit boards 103 of the light box 2 are electrically connected.

As illustrated in FIG. 4B, the light box 4B with an A1 sized display portion 102 in a landscape orientation is obtained with the same way as the light box 4A. In fact, the light box 4B is the light box 4A, which has been rotated 90 degrees counter clock wise. Moreover, the positions of the DC adapters 131 and the program switches buttons 133 of the light box 4B are adjusted for convenient use. Elements having the same function are denoted by the same reference numeral illustrated in FIGS. 1, 2A and 2B, and the repetitive explanation will be omitted.

FIGS. 5A to 5G illustrate the assembling steps of the light box 5 of the present invention, and these assembling steps may be applied to the light boxes 1, 1', 2, 3A, 3B and 4A, 4B, illustrated in FIGS. 1, 2A-2C, 3A-3B and 4A-4B, or any other modifications of the present invention. It should be noted that FIGS. 5A to 5G are partial cross figures, and people skilled in this art may proceed with the other parts, whose descriptions are omitted herein. Incidentally, elements with the same names in the following description corresponding to FIGS. 5A to 5G and in the above recitation corresponding to FIG. 1 have the same functions, and therefore, the repetitive explanation will be omitted herein.

Figure 5A:
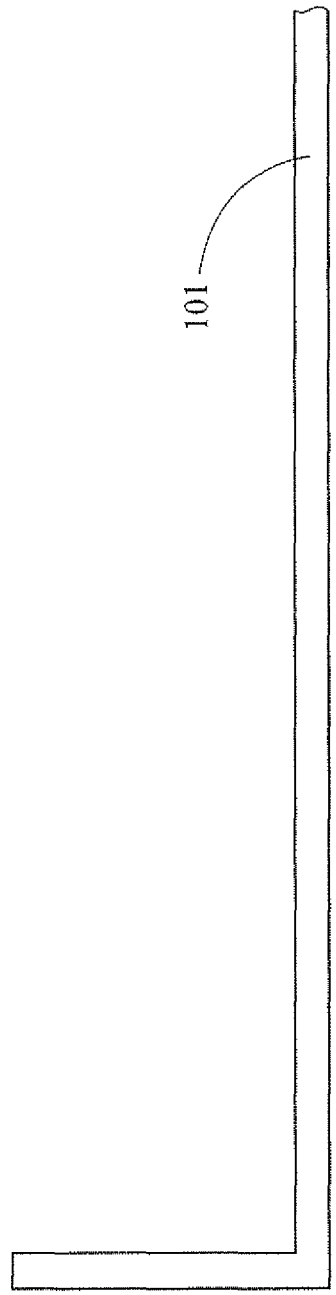
FIGS. 5A to 5G illustrate partial cross-sectional views of steps for assembling the lighting panel device according to a preferred embodiment of the present invention.
Figure 5B:
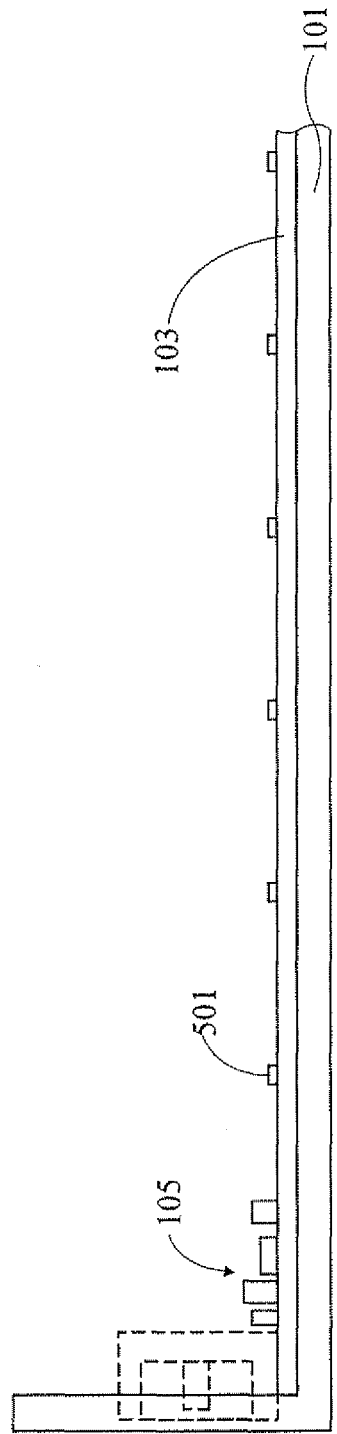
Figure 5C:
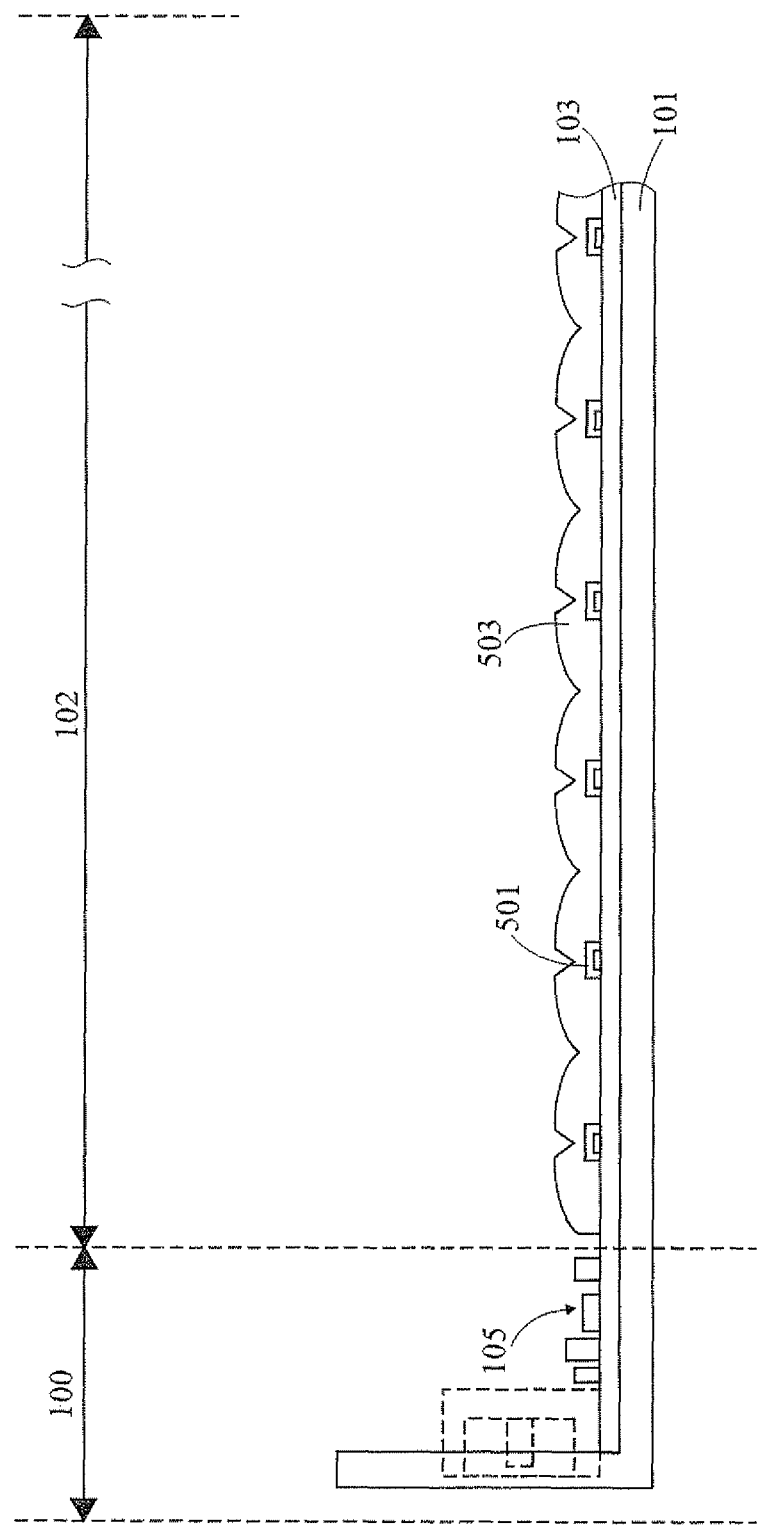
Figure 5D:
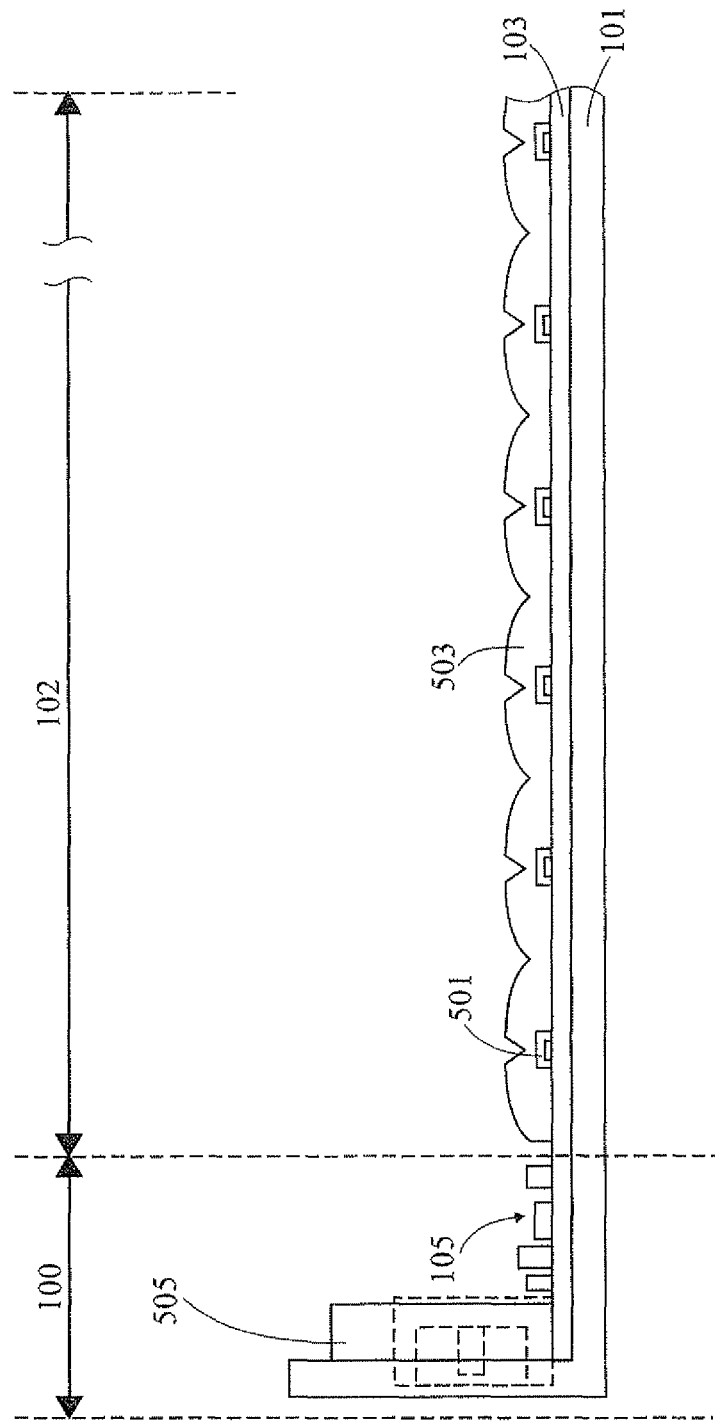
Figure 5E:
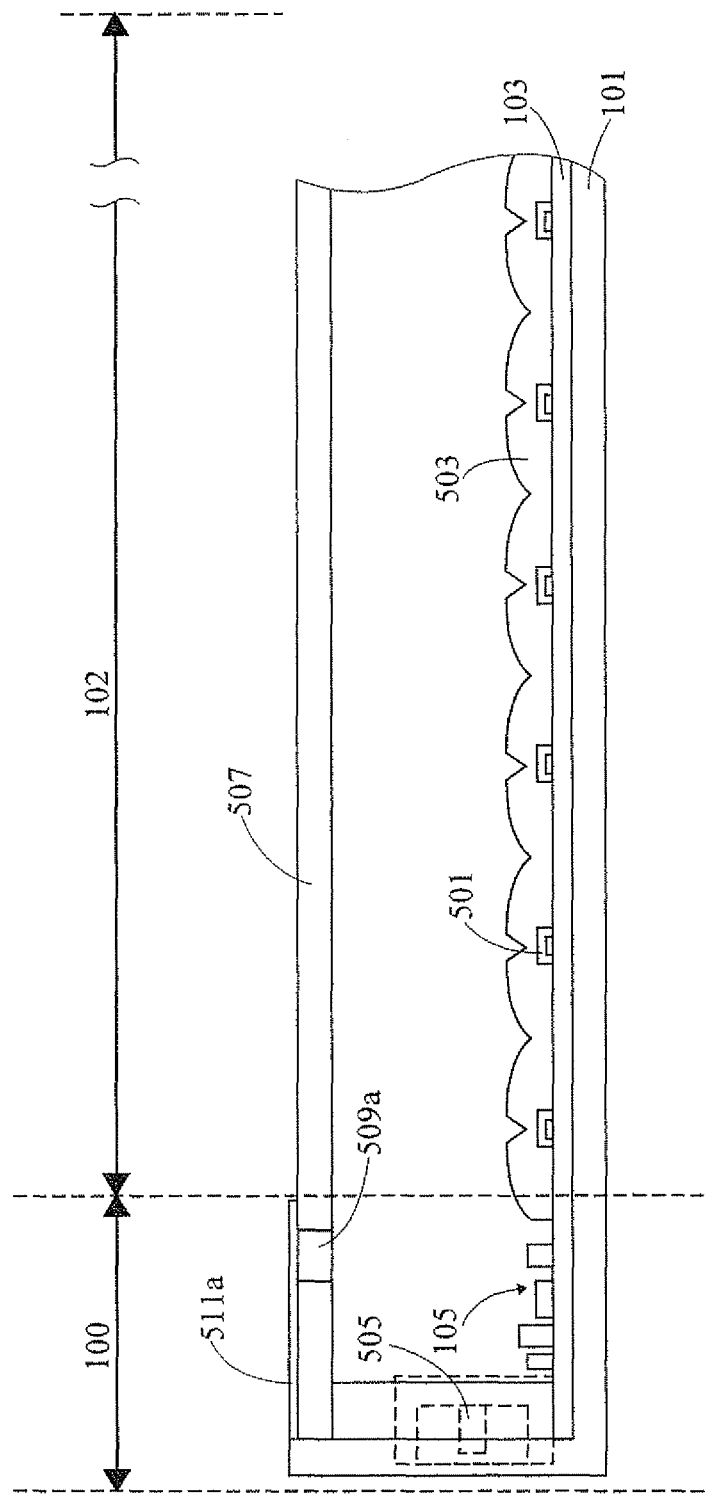

In the beginning, an outer frame 101 is provided as shown in FIG. 5A. FIG. 5B shows that the circuit board 103, the electrode pads 121, the DC adapter 131 and the program switch buttons 133, the LEDs 501 are disposed onto the outer frame 101, and the basic framework structure of the light box 5 then is provided. In FIG. 5C, it is executed to dispose a light spread structure 503 onto such basic framework structure, and each LED 501 has been consequently inserted inside a corresponding recess of the light spread structure 503. FIG. 5D shows that a spacer bar 505 is disposed, and the number of the spacer bars 505 is determined according to the size of the light box 5. FIG. 5E shows that a diffuser plate 507 is disposed above the peripheral portion 100 and the display portion 102, and the diffuser plate 507 is supported by the spacer bar 505. A first magnet 509a is embedded in the corner of the diffuser plate 507, and it should be noted that the number, shape, position of the first magnet 509a is not limited. Furthermore, a first black mask layer 511a is formed on the diffuser plate 507 corresponding to the peripheral portion 100 so as to prevent seeing the control circuit 105 underneath and to obtain a sharp edge image. Then, the semi-finished product can be used as a basic light box.

Figure 5F:
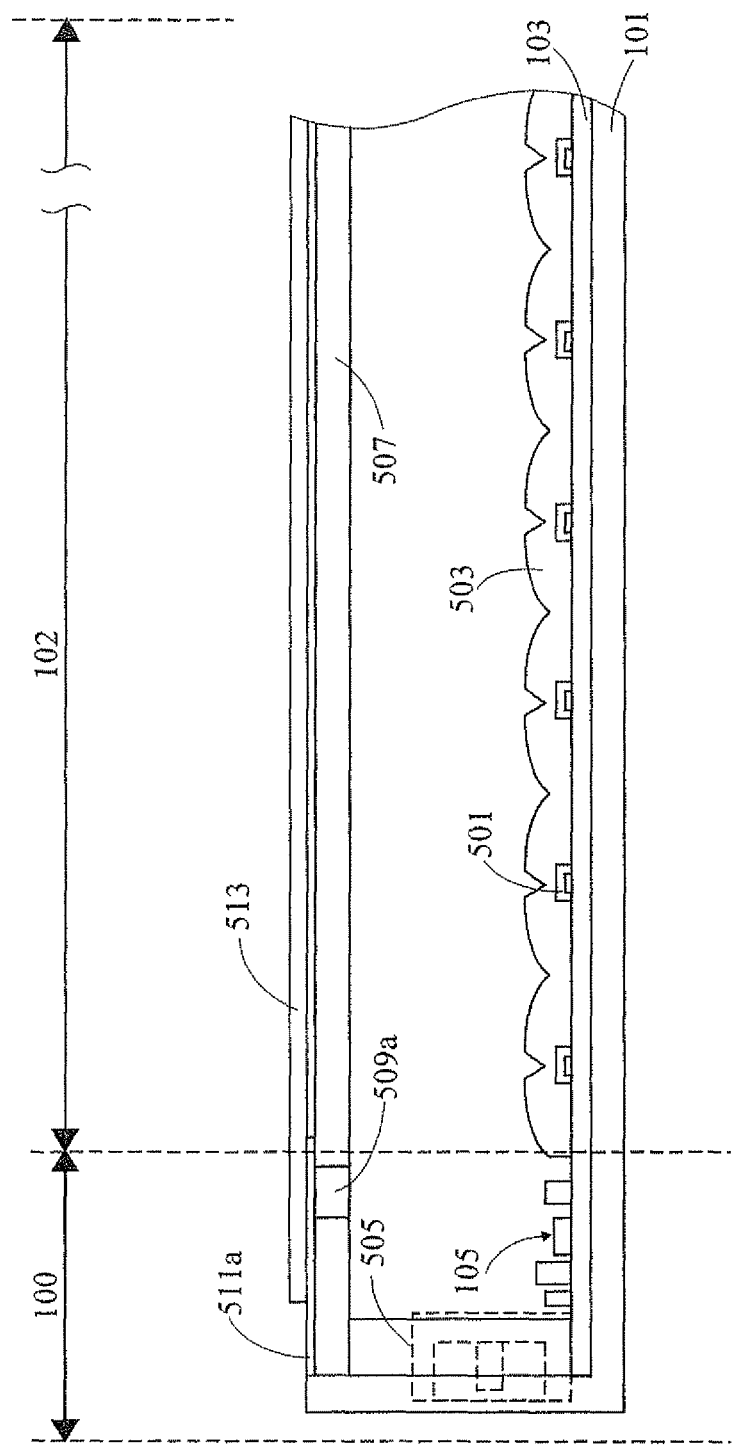
Figure 5G:
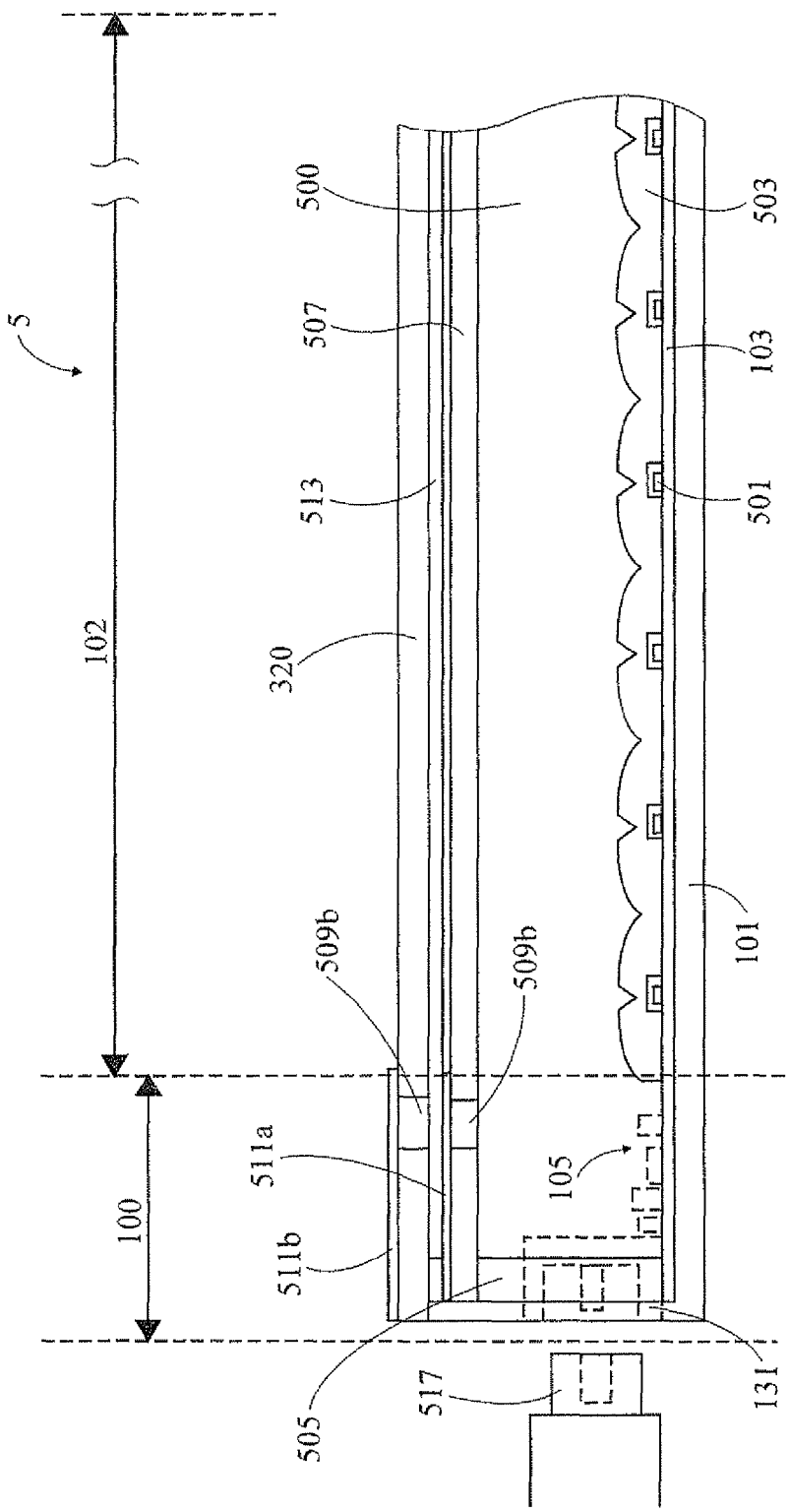

For better usage and performance, the following assembly steps can be further executed. FIG. 5F shows that an image plate 513, such as a photographic film, is disposed on top of the diffuser plate 507 above the display area 102 and is formed with an image. FIG. 5G shows that a cover 515 such as transparent plate is disposed on top of the image plate 513. The cover 515 covers the peripheral portion 100, the display portion 102, the electrode pads 121, and the image plate 513. Similarly, a second magnet 509b can be embedded at each corner of the cover 515, and the second black mask layer 511b is formed on the edge of the cover 515 to prevent seeing the control circuit 105 underneath and to obtain a sharp edge image. It also should be noted that the number, shape, position of the second magnet 509b is not limited. The first and second magnets 509a, 509b embedded in the diffuser plate 507 and the cover 515, respectively, will be automatic aligned to provide enough attraction force to clip and hold the image plate 513 (i.e. photographic film) very tight. This way, the image plate 513 can be exchanged easily by consumers. It should be noted that people skilled in this art may proceed with the aspect that omits the cover 515, the first and second magnet 509a, 509b, and the second black mask layer 511b. In such modification, the most outside of the light box 5 would be the image plate 513 formed with the first black mask layer 511a.

As the finished product illustrated in FIG. 5G, the light box 5 comprises, the outer frame 101, a circuit board 103, a control circuit 105, at least two sets of electrode pads 121, a plurality of LEDs 501, a light spreading structure 503, a spacer bar 505, a diffuser plate 507, a first magnet 509a, a second magnet 509b, a first black mask layer 511a, and a second black mask layer 511b, an image plates 513, a cover 515. The light box 5 is connected to an AC/DC power adapter 517, which converts AC power to DC power and supply such DC power to the light box 5 through the DC adapter 131.

The light spreading structure 503 is disposed upon the LEDs 501, and the LEDs 501 are inserted inside the recesses of the light spreading structure 503 for spreading lights. The spacer bar 505 is disposed between the outer frame 101 and the diffuser plate 507 to support the diffuser plate 507 and thereby the number of spacer bar 505 will be determined depending on the size of the light box 5, wherein the spacer bar 505 is preferably made of highly reflective or scattering materials such as plastic plate with white or mirror coating. Also, a space 500 is formed between the diffuser plate 507 and the light spreading structure 503. It should be noted that the diffuser plate 507 may also possible be disposed directly on top of the light spreading structure 503, therefore, the spacer bar 505 may be eliminated. The diffuser plate 507 disposed on the top of the spacer bar 505 is preferably made of materials such as semitransparent PMMA, PS, PU, PVC, PET, PEN, PES, PI, PP, PE or PC, wherein the diffuser plate 507 further comprises a first magnet 509a. In addition, the spacer bars 505 are used to support the diffuser plate 507. The first black mask layer 511a with a black coating is disposed on the peripheral portion 100 for shielding the control circuits 105, whereas the first black mask layer 511a may be a selectively component layer. An image plate 513 is disposed on the top of first magnet 509a. A cover 515 such as transparent plastic plate disposed on the image plate 513 is preferably made of PMMA, PS, PET, PEN, PES, PE, PP, PC and PU, wherein the cover 515 further comprises a second magnet 509b.

In this embodiment, the first and second magnets 509a, 509b respectively on the diffuser plate 507 and the cover 515 will automatic align together, which provide enough attraction force to hold the image plate 513 tightly for stably fixing the image plate 513 disposed therebetween. Thus, the image plate 513 may be exchanged easily by consumers. The second black mask layer 511b is also disposed on the cover 515 for the sake of shielding the control circuit 105. Consequently, the first and second magnets 509a, 509b may be added on each corner of the diffuser plate 507 and the first and the second black mask layer 511a, 511b are coated around the edge of the diffuser plate 507 to prevent seeing the control circuit 105 underneath and to obtain a sharp edge image.

Figure 6A:
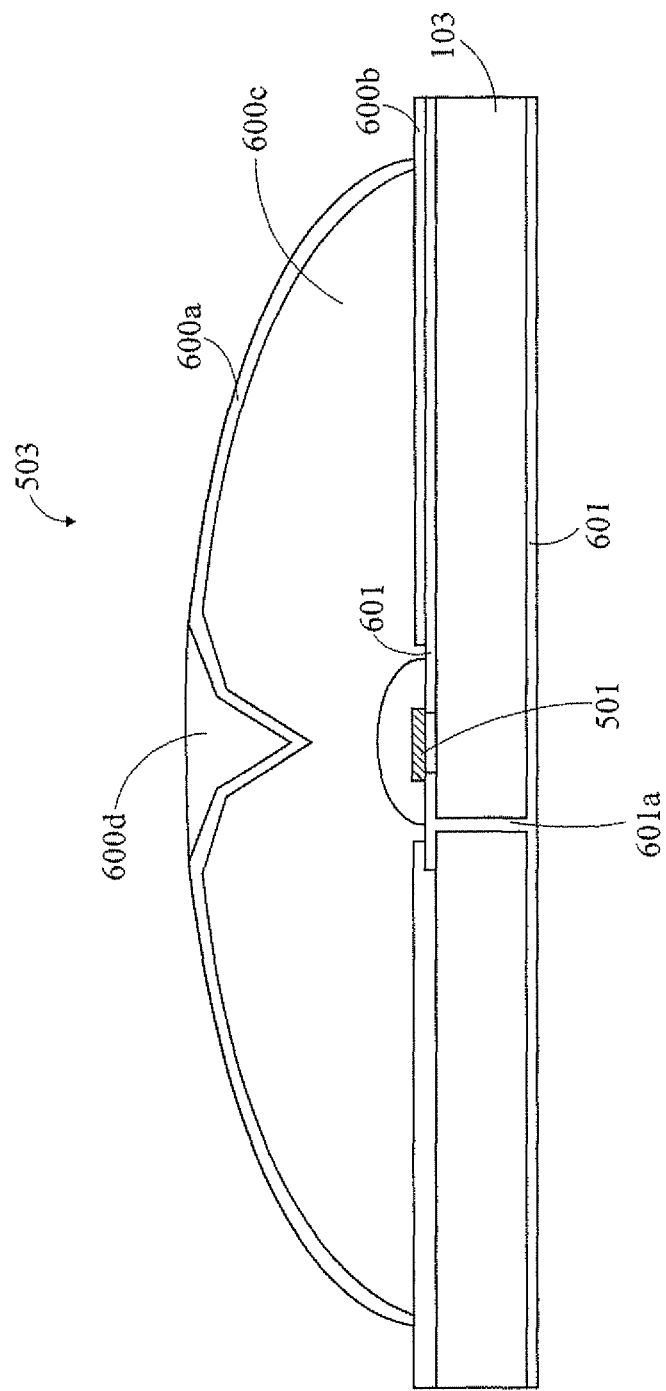
FIG. 6A illustrates a partial enlarged cross-sectional schematic view of the lighting panel device 5 of FIG. 5G.

FIG. 6A illustrates a partial enlarged cross-sectional schematic view of the light box 5 of FIG. 5G. For clear illustration and explanation purpose, in FIG. 6A, only necessary components are depicted. The shown elements of the light box 5 in FIG. 6A are the light spreading structure 503, the LEDs 501 (e.g. LED dies), the circuit board 103 and an electrode layer 601, which is patterned on the circuit board 103. The descriptions of the LEDs and the circuit board 103 are omitted herein as being identical to that defined in preceding paragraphs.

Figure 6B:
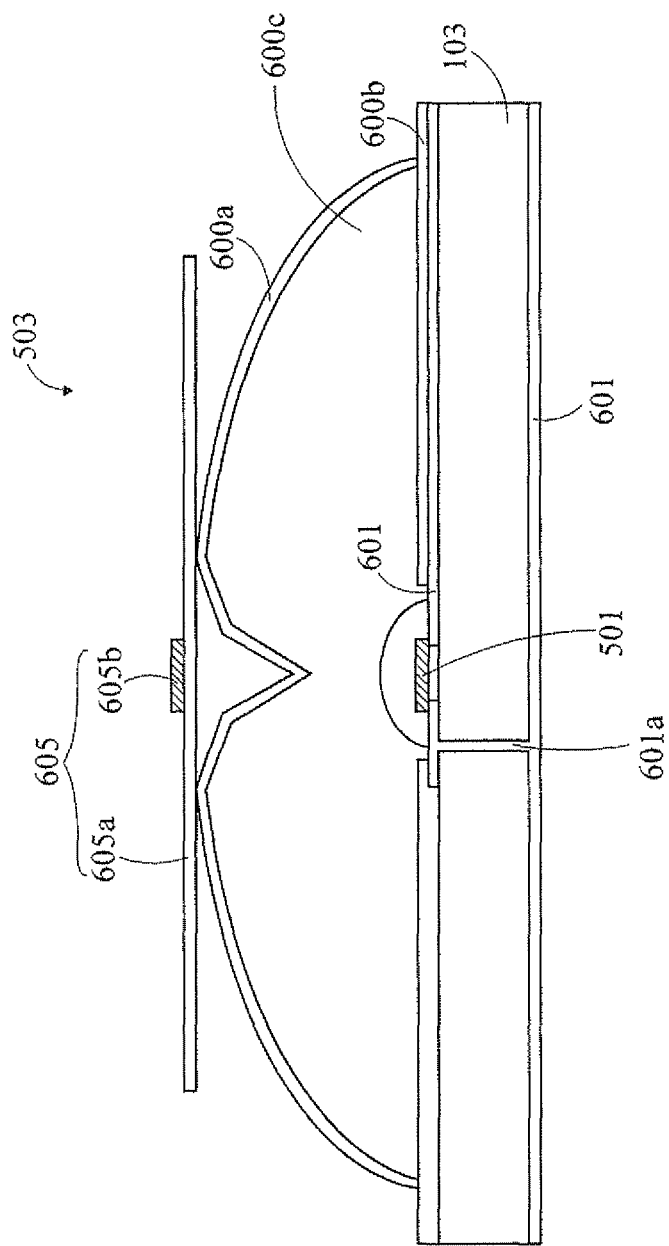
FIG. 6B illustrates a partial enlarged cross-sectional schematic view of the lighting panel device of another aspect of FIG. 5G.

Each of the light spreading structure 503 comprises a first light scattering layer 600a, a second light scattering layer 600b, a transparent (or translucent) layer 600c coated with the first light scattering layer 600a, and light diffusing materials 600d. The light spreading structure 503 has a dome-shaped body and a cone-shaped recess formed on the top of the dome-shaped body and filled with the light diffusing materials 600d. Alternatively, as illustrated in FIG. 6B, the cone-shaped recess can be covered by a patterned diffuser film 605. One example of the semi-transparent plate is a white color paper. As illustrated in FIGS. 6A and 6B, the transparent (or translucent) layer 600c coated with the first light scattering layer 600a and the cone-shaped recess filled with light diffusing material 600d overlay the second light scattering layer 600b and the LED 501.

With this specific design of the light spreading structure 503, light travels from the LED 501 to the transparent layer 600c to the air will be refracted, reflected or scattered due to the selection of the refractive index of the transparent (or translucent) layer 600c and the refractive index of air (outside the light spreading structure 503).

In the present invention, the first light scattering layer 600a coated onto the transparent (or translucent) layer 600c and is made of, for example, a polymer resin containing titanium dioxide particles (ex. a commercial white color paints) calcium carbonate particles, silica oxide particles, or polymeric particle with differentiable refractive index.

The second light scattering layer 600b can be made of transparent or semi-transparent resins, for example, a polymer resin, containing light scattering particles such as titanium dioxide (e.g. a commercial white color paints), calcium carbonate, silica oxide, polymeric particle with differentiable refractive index, or air micro-voids, and be sprayed or coated onto the circuit board 103 and the electrode layer 601 on areas outside the LED 501. The second light scattering layer 600b can reflect and scatter the light generated from the LED 501 to enhance the utilization of the light.

The transparent (or translucent) layer 600c can be made of any type of transparent (or translucent) polymeric materials such as silicon rubber, polyurethane, polystyrene, polyester, polycarbonate, polyimide, polyacrylic resin, PMMA, ABS, PVC, PE, PP or a combination thereof.

As shown in FIG. 6A, the light diffusing material 600d used to fill up the cone-shaped recess is made of transparent polymer materials containing light scattering particles such as titanium dioxide particles, calcium carbonate particles, silica oxide particles, metallic particles, or air microvoids or a mixture of plurality types of particles. It should be noted that, in this embodiment, the shape of the cone-shaped recess is depicted as illustrated, however, in other embodiment, the shape of the cone-shaped recess can be modified, and for example, the tip of the cone-shaped recess can be sharp or rounded.

On the other hand, as shown in FIG. 6B, the patterned diffuser film 605 used to cover the cone-shaped recess is made of semi-transparent plate, The patterned diffuser film 605 can be cut to a desired shape to cover the entire recess area or partially cover the recess area. The pattern diffuser film 605 can also be made of transparent or translucent film 605a where a desired pattern coating 605b made of a polymer material containing light scattering particles such as titanium dioxide particles, calcium carbonate particles, silica oxide particles, metallic particles, or air microvoids or a mixture of plurality types of particles is disposed on the surface of the transparent or translucent film 605a. In this case, the light diffusing material 600d used to fill up the cone-shaped recess will not be needed.

In addition, since the majority of light generated from the LED 501 travels along the normal of the circuit board 103, the cone-shaped recess formed at the top of the dome-shaped body of the transparent (or translucent) layer 600c assists guiding the light departing from the normal of the circuit board 103 and towards the peripheral of the dome-shaped body. Accordingly, light still travels through the cone-shaped recess and are thereby scattered by the light diffusing material 600d filled within the cone-shaped recess or scattered by the pattern diffuser film 605, such that light generated from the LED 501 can be uniformized.

In this embodiment, the LED 501 can be an SMD type LED which can be electrically connected to the electrode layer 601 by a conventional SMT process. The electrode layers 601 are patterned onto two surfaces, the top surface and the bottom surface, of the circuit board 103 and are electrically connected through a via hole 601a. The electrode layers 601 can be made of Cu, Ag, Ni, Au, Al or conductive inks such as silver paste, supper paste or carbon black paste.

Figure 7A:
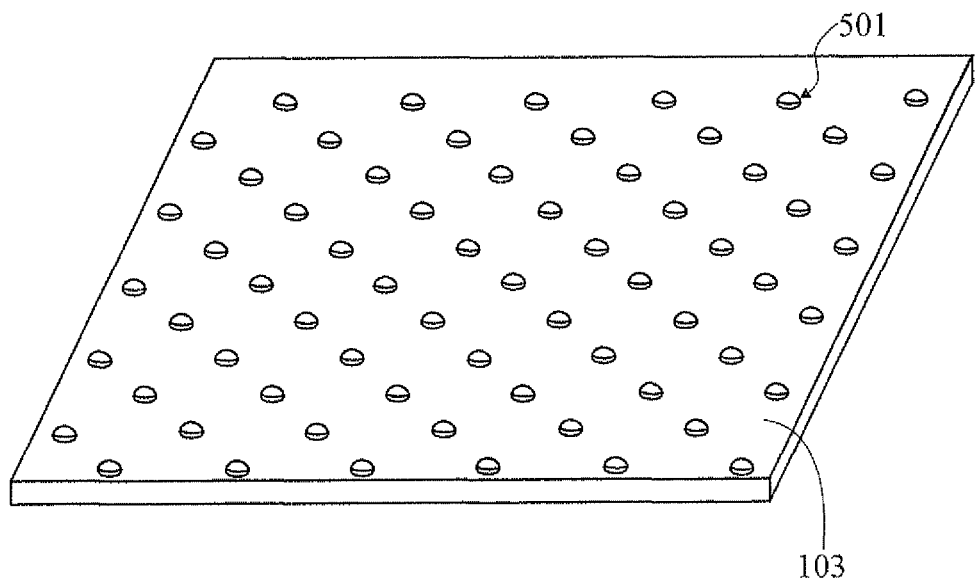
FIG. 7A to FIG. 7D are enlarged schematic views illustrating the lighting panel device of the present invention.
Figure 7B:
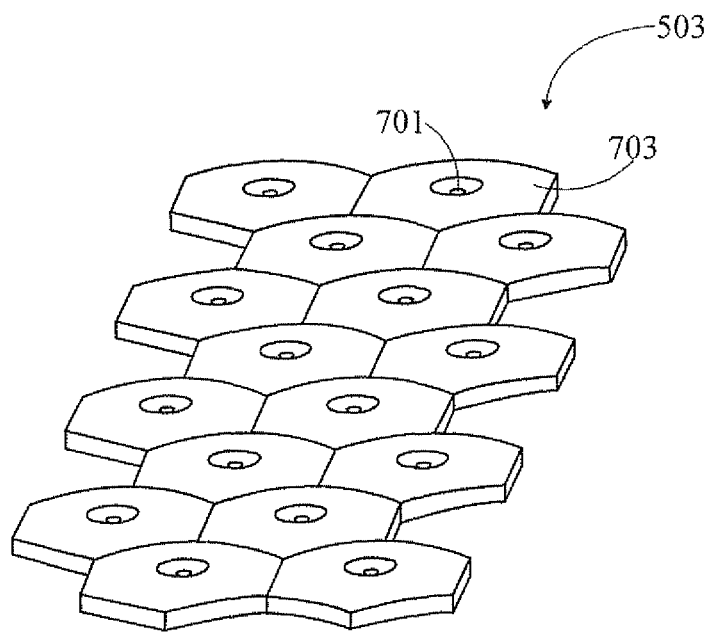
Figure 7C:
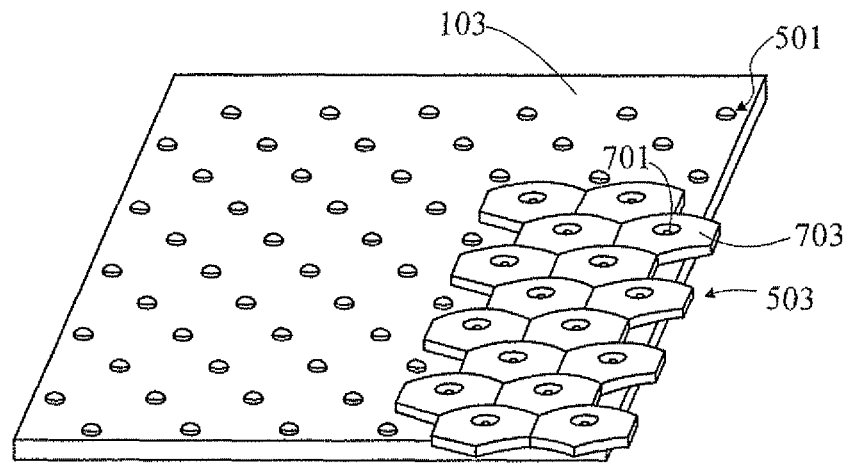
Figure 7D:
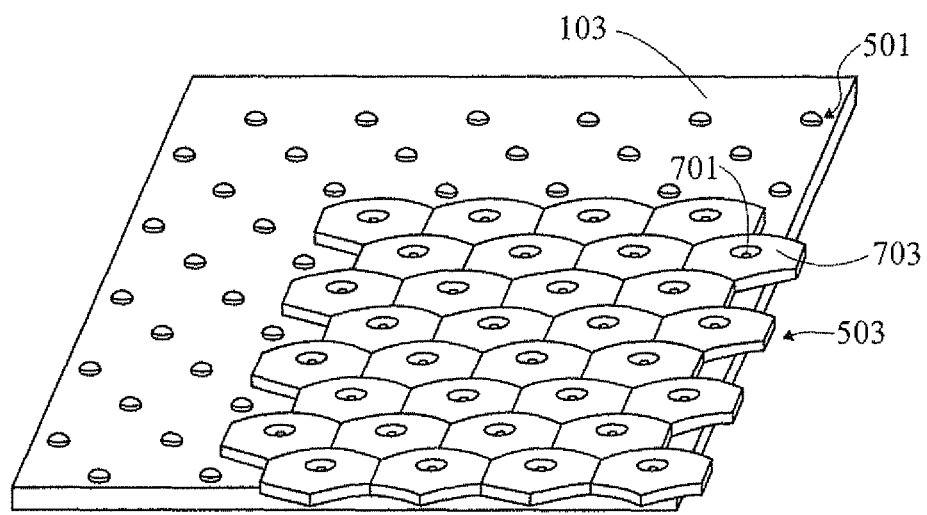

FIG. 7A to FIG. 7D are perspective views related to FIG. 6A and FIG. 6B. FIG. 7A shows the LEDs 501 disposed on circuit board 103. FIG. 7B illustrates a plurality of light spreading structures 503, each of which includes a plurality of dome-shaped bodies 703 and cone-shaped recesses 701, connected and arranged with each other, for example, in a configuration of honeycomb. Each of the dome-shaped bodies 703 comprises the first light scattering layer 600a, the second light scattering layer 600b, the transparent (or translucent) layer 600c coated with the first light scattering layer 600a. FIG. 7C illustrates the light spreading structures 503 are assembled onto the circuit board 103. Conceivably, each of the light spreading structure 503 can be individually manufactured and then tiled with each other in a seamless way, as illustrated in FIG. 7D. It should be noted that the dome-shaped bodies 703 and cone-shaped recesses 701 filled with light diffusing materials 600d or covered by a patterned diffuser film 605 are designed and arranged according to the pitches of the LEDs 501.

In summary, the present invention provides a revolutionary direct-lit light box comprising the ultra-slim lighting panels in which the ultra-slim format LED dies packaging structures are used as the light sources. Moreover, the revolutionary direct-lit light box with ultra-slim size not only provides uniform lights for unique applications but also offers regional on/off control and local dimming features for both dynamic imaging effect and power saving. The lighting panels may be panelized to form a light box with an unlimited size and dimension so as to flexibly assemble a direct-lit light box with a large scale. The direct-lit light box can provide uniform light, such that the overall thickness of the revolutionary direct-lit light box is much thinner with respect to the traditional direct-lit light box. Furthermore, an excellent solution in portability and space saving for various commercial applications is provided. In addition, since the display portion of the light box can be panelized from A3 size to A2 size or A1 size to obtain even-width frame design by virtue of disposing both control electronics and LED circuits on the circuit board of the light box, the sizes of the direct-lit light box may be adjusted as required.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered by the appended claim.

What is claimed is:

1. A light box, comprising:
   a cover;
   a diffuser plate;
   a first magnet embedded in the diffuser plate;
   a second magnet embedded in the cover, wherein the first magnet and the second magnet are formed at corresponding positions;
   a peripheral portion, having four margins, the opposing margins being defined with equal widths;
   a display portion, being surrounded by the peripheral portion and being rectangular; and
   at least two sets of electrode pads, being disposed on at least two of the margins, respectively, and each set of the at least two sets of the electrode pads comprising a connector electrode pad, disposed at the corresponding margin.

2. The light box of claim 1, wherein the least two sets of the electrode pads are two sets of the electrode pads, the light box further comprises an outer frame, the outer frame comprises two of the margins, and the two sets of the electrode pads are disposed on the other two of the margins respectively.

3. The light box of claim 1, wherein the least two sets of the electrode pads are four sets of the electrode pads, the light box further comprises an outer frame, the outer frame comprises one of the margins, and the four sets of the electrode pads are disposed on the other three of the margins.

4. The light box of claim 1, wherein the least two sets of the electrode pads are eight sets of the electrode pads, and the eight sets of the electrode pads are disposed on the four margins.

5. The light box of claim 4, wherein the light box further comprises an outer frame.

6. The light box of claim 1, wherein the display portion comprises a plurality of LEDs.

7. The light box of claim 1, wherein each set of the at least two sets of the electrode pads comprises power adapter pads.

8. The light box of claim 1, wherein the light box further comprises a circuit board, and the display portion is disposed on the circuit board.

9. The light box of claim 1, further comprising a control circuit, being disposed on the peripheral portion and having an LED driver, a micro control unit (MCU) for controlling the LED driver, and a DC/DC converter.

10. The light box of claim 6, further comprising a light spreading structure, disposed on the plurality of LEDs.

11. The light box of claim 1, further comprising an image plate, wherein the image plate is formed with an image.

12. The light box of claim 11, wherein the image plate is a photographic film.

13. The light box of claim 11, further comprising a cover, wherein the cover is a transparent plate, and the cover covers the peripheral portion, the display portion, the at least two sets of the electrode pads, and the image plate.

14. The light box of claim 11, further comprising at least one spacer bar, disposed on the peripheral portion to support the image plate.

15. The light box of claim 1, wherein the diffuser plate is disposed above the display portion and the peripheral portion.

16. The light box of claim 1, further comprising:
a first black mask layer, being formed on the diffuser plate and corresponding to the peripheral portion; and
a second black mask layer, being formed on the cover and corresponding to the peripheral portion.

17. The light box of claim 1, wherein the light box is a square, a rhombus or a trapezoid shape.

* * * * *